(12) United States Patent
McCullough

(10) Patent No.: US 9,820,576 B2
(45) Date of Patent: Nov. 21, 2017

(54) MODULAR FURNITURE SYSTEM

(71) Applicant: Chelsea McCullough, Austin, TX (US)

(72) Inventor: Chelsea McCullough, Austin, TX (US)

( * ) Notice: Subject to any disclaimer, the term of this patent is extended or adjusted under 35 U.S.C. 154(b) by 0 days.

(21) Appl. No.: 14/739,973

(22) Filed: Jun. 15, 2015

(65) Prior Publication Data

US 2016/0345739 A1 Dec. 1, 2016

Related U.S. Application Data

(60) Provisional application No. 62/166,562, filed on May 26, 2015.

(51) Int. Cl.
| | |
|---|---|
| *A47C 4/02* | (2006.01) |
| *A47B 13/02* | (2006.01) |
| *A47B 3/06* | (2006.01) |
| *F16B 12/44* | (2006.01) |
| *A47B 13/08* | (2006.01) |
| *F21V 33/00* | (2006.01) |

(52) U.S. Cl.
CPC ............. *A47C 4/028* (2013.01); *A47B 3/06* (2013.01); *A47B 13/02* (2013.01); *A47B 13/021* (2013.01); *A47C 4/02* (2013.01); *F16B 12/44* (2013.01); *A47B 13/08* (2013.01); *A47B 2013/022* (2013.01); *A47B 2220/0077* (2013.01); *F21V 33/0012* (2013.01)

(58) Field of Classification Search
CPC ........... A47C 4/02; A47C 4/021; A47C 4/022; A47C 4/028; A47C 4/03; A47C 7/00; A47B 3/06; A47B 13/02; A47B 13/021; A47B 13/08; A47B 2013/022; A47B 2220/0077; F16B 12/44; F21V 33/0012
See application file for complete search history.

(56) References Cited

U.S. PATENT DOCUMENTS

| | | | | |
|---|---|---|---|---|
| 2,694,609 A | * | 11/1954 | Trafford | A47B 1/00 108/64 |
| 2,701,009 A | * | 2/1955 | Richard | A47C 3/04 108/156 |
| 6,032,590 A | * | 3/2000 | Chen | A47B 3/06 108/158.12 |
| 6,568,058 B1 | | 5/2003 | Wieland | |
| 6,637,350 B2 | * | 10/2003 | McKsymick | A47B 21/00 108/25 |
| 7,134,728 B1 | | 11/2006 | Buhrman | |
| 7,213,885 B2 | | 5/2007 | White, III | |
| 8,454,088 B2 | | 6/2013 | Shokouhi | |
| 8,590,976 B2 | | 11/2013 | Davis | |
| 2010/0253127 A1 | | 10/2010 | Haimoff | |

(Continued)

OTHER PUBLICATIONS

AFP Relaxnews "No assembly required: Magnetic furniture snaps together without need for tools" NY Daily News; Dec. 27, 2013; USA.

(Continued)

*Primary Examiner* — Philip F Gabler
(74) *Attorney, Agent, or Firm* — Matthew E Burr

(57) ABSTRACT

A system of modular components to assemble a desired article of furniture provides a plurality of tool-less fasteners and a collection of a plurality of furniture components selectively connectable to each other with one or more of the plurality of tool-less fasteners to assemble a desired article of furniture.

15 Claims, 13 Drawing Sheets

(56) References Cited

U.S. PATENT DOCUMENTS

| | | | | |
|---|---|---|---|---|
| 2011/0233976 A1* | 9/2011 | Hanson | ............... | A47C 4/02 |
| | | | | 297/217.1 |
| 2012/0119629 A1 | 5/2012 | Nelson | | |
| 2013/0234576 A1* | 9/2013 | Hixson | ............ | A47C 13/005 |
| | | | | 312/265.5 |
| 2015/0021970 A1* | 1/2015 | Revta | ............ | A47C 9/10 |
| | | | | 297/452.1 |

OTHER PUBLICATIONS

Keith McCord "Student creates easy assemble/disassemble college furniture" ksl.com; Apr. 29, 2011; USA.

Way Basics 'No Tools' Flat-Pack Furniture | Inhabitots; http://www.inhabitots.com/way-basics-no-tools-flat-pack-furniture/[Apr. 9, 2014 9:06:09 PM].

* cited by examiner

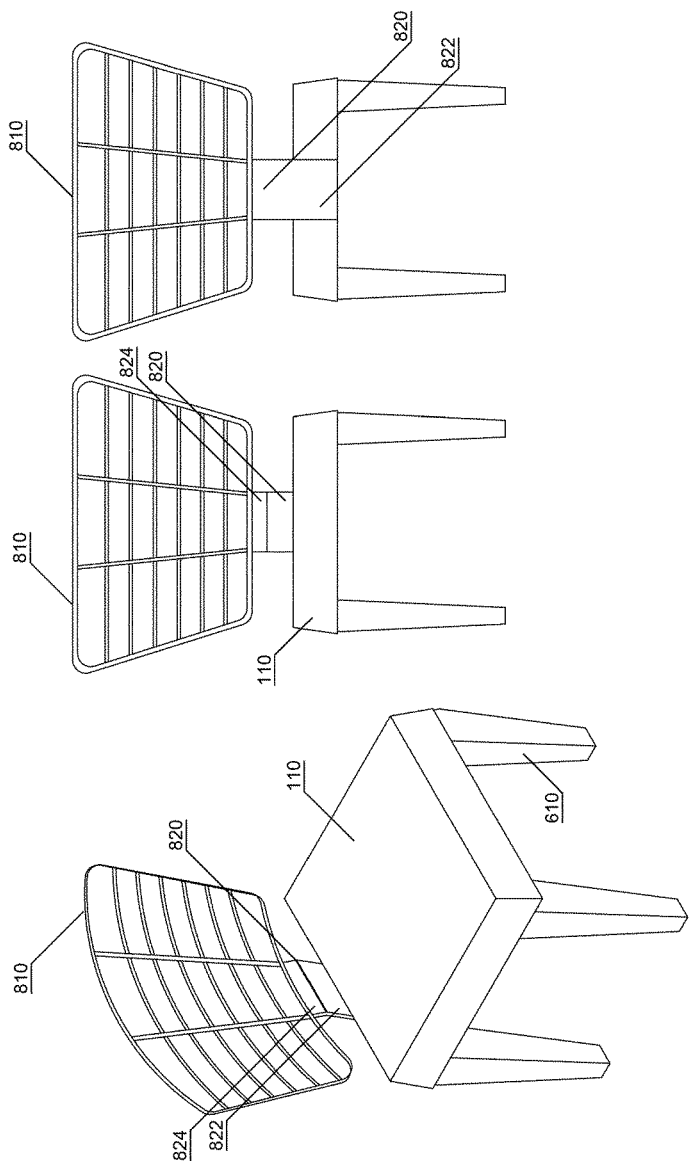

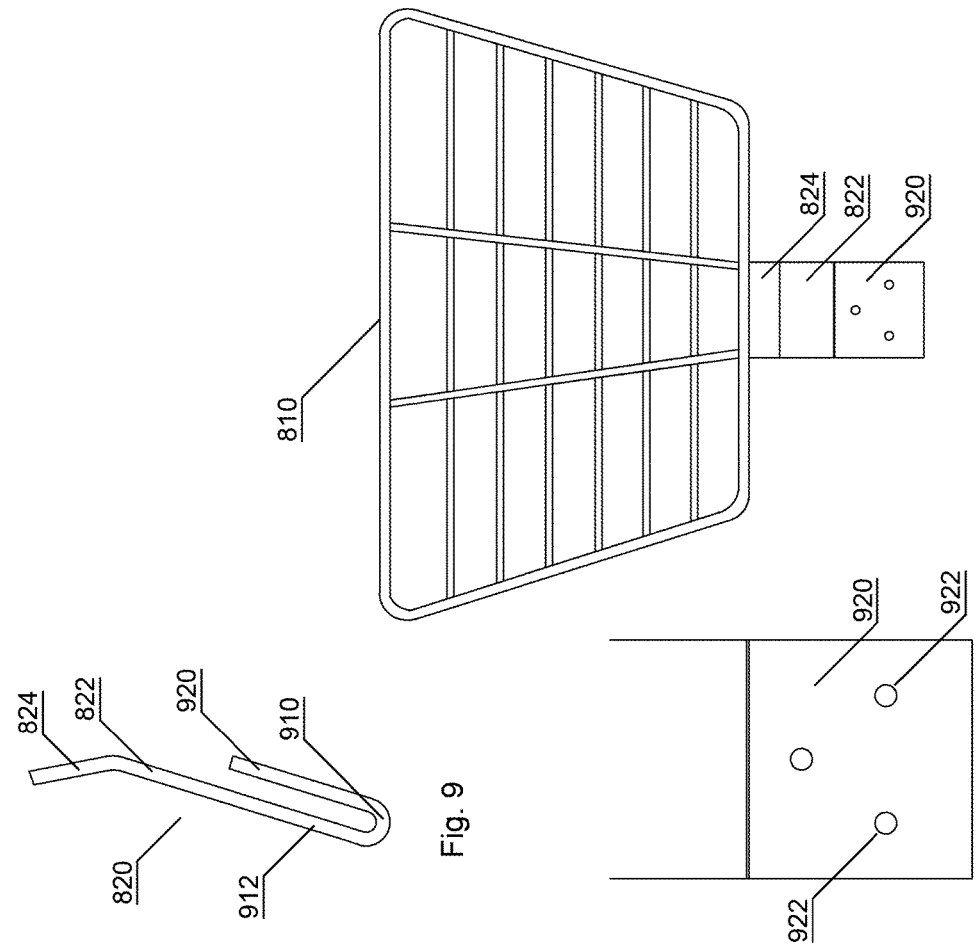

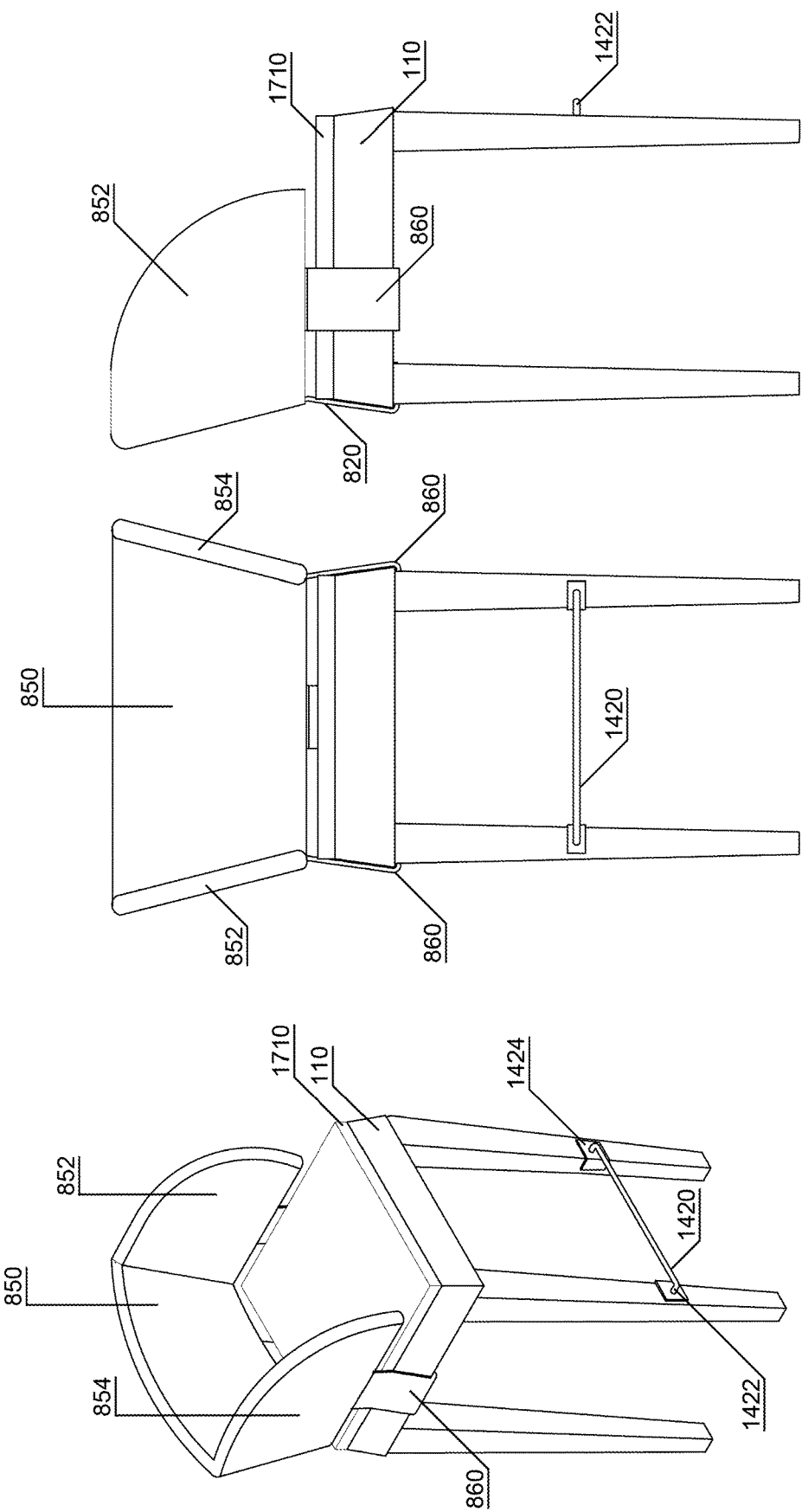

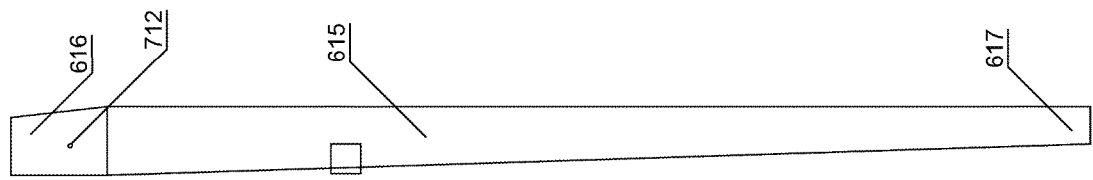
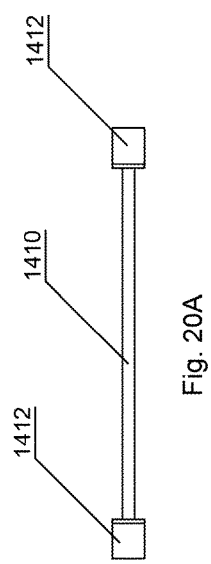
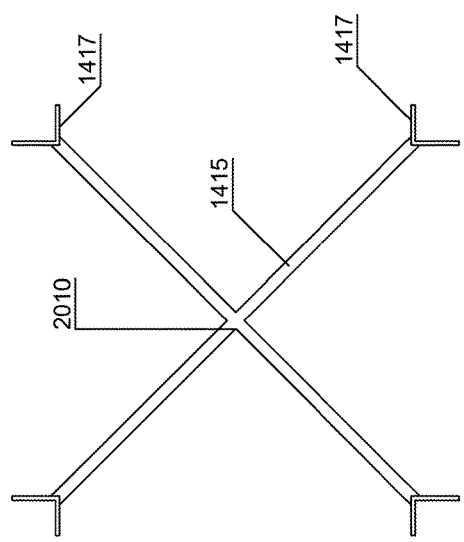

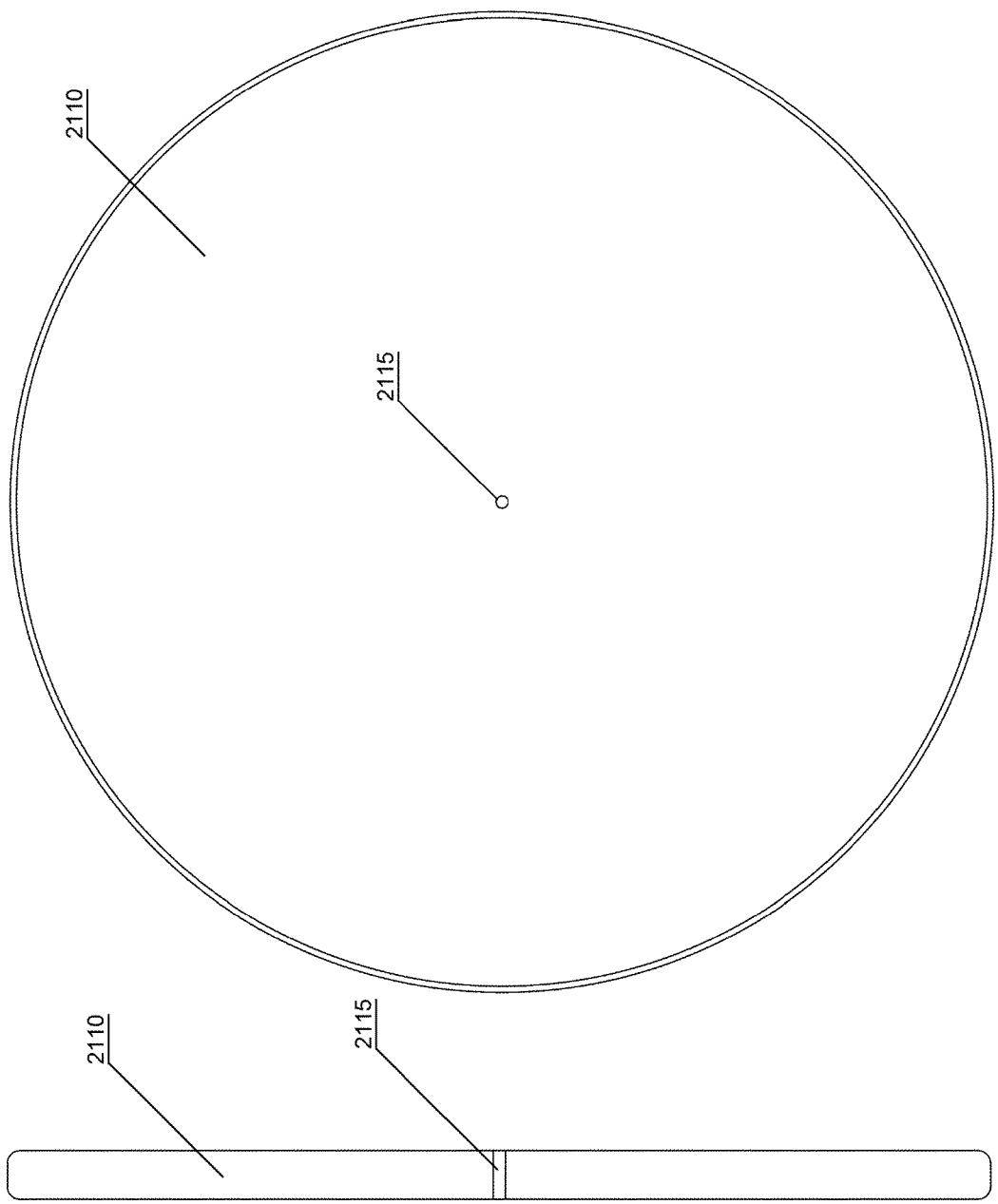
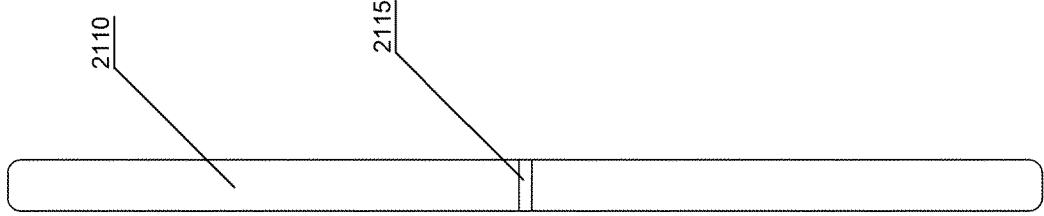
Fig. 22A
Fig. 22B

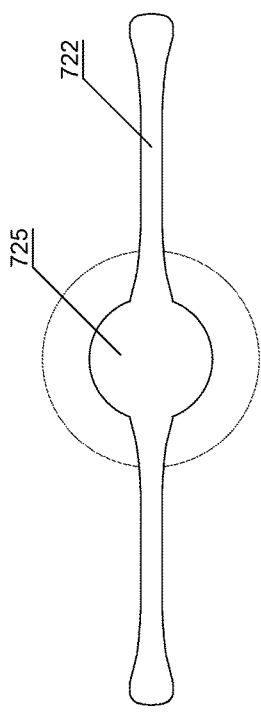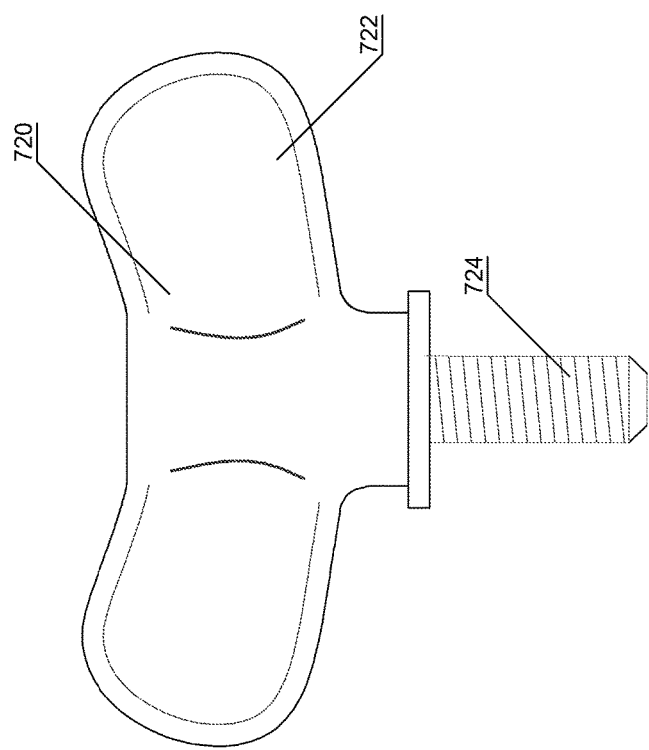

MODULAR FURNITURE SYSTEM

CROSS-REFERENCE TO RELATED APPLICATIONS

The present application is related to, claims priority from and the benefit of U.S. provisional patent application Ser. No. 62/166,562, filed May 26, 2015, by the same invention and having the same title, the disclosure of which is incorporated herein by reference for all purposes as if set forth here in its entirety.

THE FIELD OF THE INVENTION

The invention relates to the field of furniture. Particularly, the invention relates to a system of modular components for tool-less furniture assembly.

BACKGROUND

A variety of shapes and sizes of furniture have been developed over the years to provide comfort and decoration. Consumers appreciate furniture that is attractive, fits their unique style and can serve multiple purposes. Today's consumer is also increasingly mobile and so they seek furniture that is easy to move, stack and store while being able to stand-up to the wear-and-tear of everyday use. They desire furniture that can accommodate a variety of lifestyle changes, changes in living space and even be appropriate for both indoor and outdoor use. Thus, what is desirable is furniture that is versatile, durable, customizable and easy to move.

Most furniture remains static once purchased. Customers value furniture that can adapt to their ever-changing spatial needs or styles. It is desirable if one piece of furniture can be modified to provide multiple functions by adding or removing components for example, a stool that, when coupled with additional items, can become an ottoman or a chair or legs can be switched for others of varying height to go from a club chair to a bar stool.

Once purchased, consumers expect furniture that is lightweight and can be easily assembled with few or no tools. Once assembled, most furniture cannot be easily disassembled. Most furniture is assembled using nails, staples, epoxy or some other type of fastener. Most furniture requires various tools to assemble and disassemble. Further, various types of furniture have upholstery covering the fastener thus making it difficult to disassemble the furniture. This presents a challenge for consumers, especially when the furniture needs to be transported from one location to another.

One aspect that makes furniture cost-prohibitive is shipping and packaging. For example, a large piece of furniture requires a large amount of space during shipping. The non-solid shape of most furniture makes it difficult to maximize the space utilized when packaging and shipping furniture. This adds increased costs of shipping due to the amount of space the furniture requires, regardless if the furniture uses all or most of the required space. Also the weight of most furniture can be cost-prohibitive. Lightweight furniture where the components easily stack together or where the components fit inside of themselves saves money that is usually wasted on shipping.

When furniture is moved, damage frequently occurs in transit, even if customers hire professional movers. For those consumers who move frequently, it is desirable to have furniture that is made of sturdy materials that are not easily damaged. It is also desirable for that furniture to be made of modular components so if one piece is broken, only one piece needs to be replaced as opposed to the entire piece of furniture.

SUMMARY

The invention relates to a modular furniture assembly that can be adapted, assembled, disassembled, rearranged, moved and cleaned in a quick and efficient manner with minimal effort. In an exemplary embodiment, the modular furniture assembly comprises a base made of a seat pan, a set of legs (a set is made up of four total legs, for example) which can be of varying sizes. This base may then accept a series of back options (including wire, metal and wood options) and may include additional components such as an attachable cushion. There are also available lighting components and various storage components that all may be attached and removed from the base. All options for items adhering to the seat pan are joined with a tool-less fastener such as a thumbscrew, for example. In one exemplary embodiment, the base, made up of the seat pan and sets of legs, serves as a support surface on which a user can sit, and the additional members act as additional components for leaning back, storage or lighting.

The furniture system is configured to allow a user to quickly couple or decouple the additional components and the base with minimal effort and without the use of a tool. The ease of coupling a member to the base enables a consumer to easily form many configurations of furniture assemblies.

The base is designed such that it can provide a variety of configurations of modular furniture assemblies. The base hosts a standard set of legs (of varying lengths) that can be utilized to form a variety of different furniture assemblies (a chair, a barstool, a bar table.) When additional components are added to the base, different furniture pieces are created. The standardized configuration of bases and additional components enables a user to form a variety of different types of furniture assemblies, which they are able to modify based on their ever-changing needs.

This also makes manufacturing convenient because a manufacturer can produce a standard seat-pan and a series of additional components that have a substantially similar configuration, then arrange (or allow the end user to arrange) the bases and additional components into a variety of configurations to form different types of furniture. The user can purchase one or more seat pans and many different additional components, then combine them to form a number of different furniture assemblies.

For example, a seat pan, a set of short legs, a cushion and a wire back component can be employed to form a chair having a backrest. Optionally, a bar stool can be formed by swapping the shorter legs for taller legs and removing the cushion. That same configuration (base and tall legs) can be modified to form a bar table by removing the back component and adding a flat wooden component. That bar table can be modified by swapping shorter legs for the taller legs to form a lower side table. If the user wishes to remove the flat wooden component, the furniture reverts to a stool. An endless variety of furniture assemblies can be formed by utilizing bases and additional components having a standardized, substantially similar configuration.

The configuration of the base and additional components of the present invention provides many benefits to both the consumer. For example, the present invention enables the consumer to have a piece of furniture in a remote location where previously other pieces of furniture could not be moved due to their bulkiness and/or size. The present invention is easily disassembled, thus enabling a consumer to locate the base(s) and/or additional components in an otherwise inaccessible location and then assemble them to form a furniture assembly. Furthermore, the present invention enables a manufacturer and/or retailer to stock separate pieces of furniture, i.e., a base and components. This is advantageous for shipping and storing. For instance, the manufacturer and/or retailer is only required to store smaller component pieces and is able to stack the bases or additional components having the same respective configuration on top of each other when loading and unloading from freight. Likewise, the bases and transverse members can be stacked in an orderly fashion in storage.

The furniture assembly of the present invention is versatile, modular, interchangeable and convenient. These and other objects and features of the present invention will become more fully apparent from the following drawings, description and appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 8A is a front view isometric diagrammatic illustration of a modular chair of the present invention.

FIG. 8B is a front view diagrammatic illustration of the modular chair of FIG. 8A.

FIG. 8C is a rear view diagrammatic illustration of the modular chair of FIG. 8A.

FIG. 9 is a side view diagrammatic illustration of an exemplary embodiment of a chair back mounting unit of the present invention.

FIG. 10 is a front view diagrammatic illustration of a detail of the mounting unit of FIG. 9.

FIG. 11 is a front view diagrammatic illustration of the mounting unit of FIG. 9 with a back unit attached thereto.

FIG. 12 is a rear view diagrammatic illustration of the mounting unit with back unit of FIG. 11.

FIG. 13 is a top view of the back unit of FIG. 12.

FIG. 17 is a front view isometric diagrammatic illustration of an exemplary alternative embodiment of a modular stool of the present invention.

FIG. 18 is a front view diagrammatic illustration of the modular stool of FIG. 17.

FIG. 19 is a side view diagrammatic illustration of the stool of FIG. 17.

FIG. 20A is a front view diagrammatic illustration of an exemplary embodiment of a stool leg support member of a modular furniture system of the present invention.

FIG. 20B is a top view diagrammatic illustration of an exemplary alternative embodiment of a stool leg support member of a modular furniture system of the present invention.

FIG. 21 is a side view diagrammatic illustration of an exemplary embodiment of a leg member of the present invention.

FIG. 22A is a top view diagrammatic illustration of an exemplary embodiment of a table top of a modular furniture system of the present invention.

FIG. 22B is a side view diagrammatic illustration of the table top of FIG. 22A.

FIG. 23A is a side view diagrammatic illustration of an exemplary embodiment of a fastener of a modular furniture system of the present invention.

FIG. 23B is a top view diagrammatic illustration of the fastener of FIG. 23A.

Figure 1:
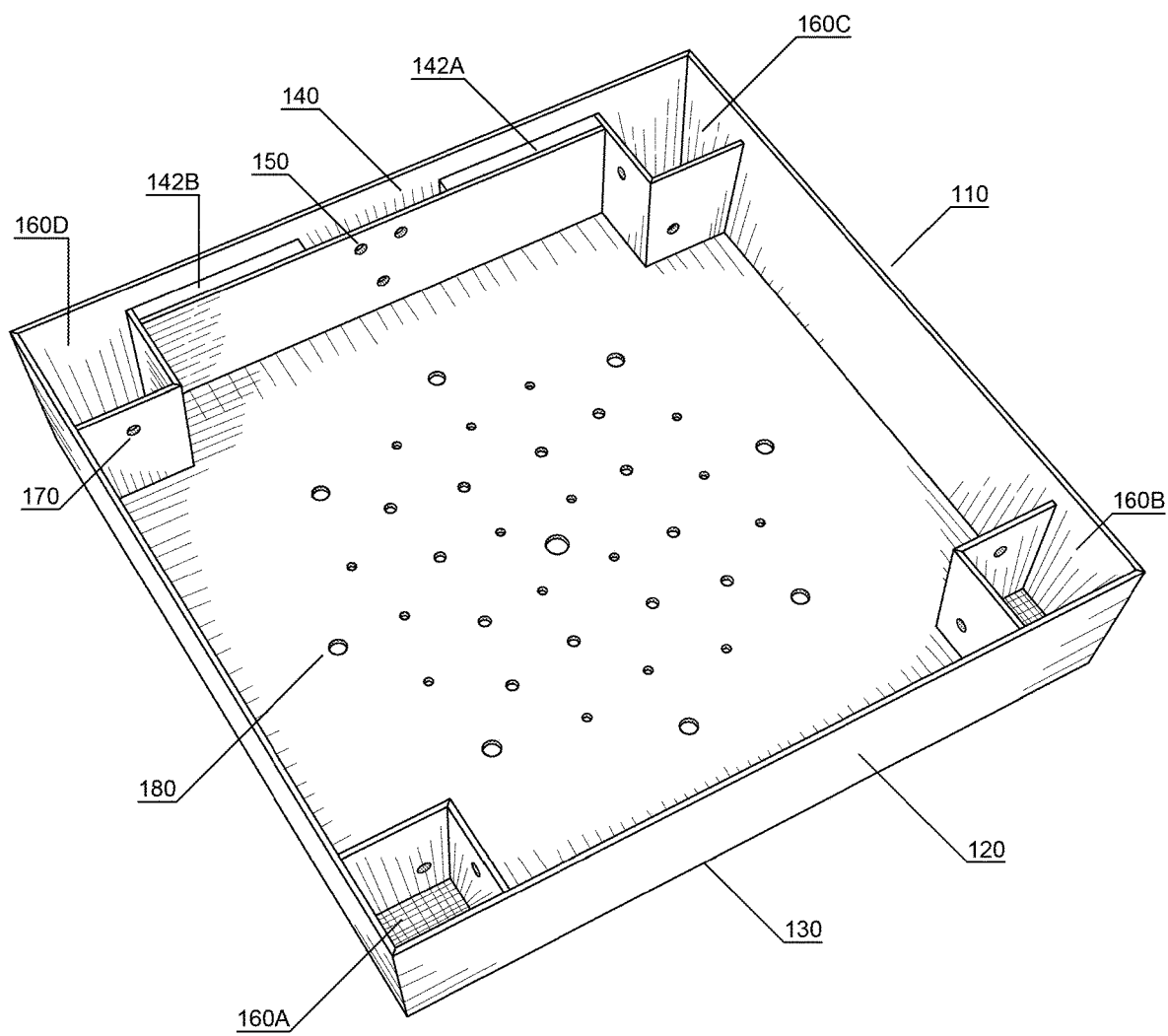
FIG. 1 is a bottom view diagrammatic illustration of an exemplary embodiment of a base pan of a modular furniture system of the present invention.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Notation and Nomenclature

Certain terms may be used throughout the following description and claims to refer to particular system components. As one skilled in the art will appreciate, different sources for components may refer to a component by different names. This document does not intend to distinguish between components that differ in name but not function.

In the following discussion and in the claims, the terms "including" and "comprising" are used in an open-ended fashion, and thus should be interpreted to mean "including, but not limited to." Also, the terms "couple," "attach" and "connect" (and grammatical variants thereof) are intended to mean either an indirect or direct connection. Thus, if a first component attaches to a second component, that connection may be through a direct connection or through an indirect connection via other components and connections. The term "invention" is intended to be read broadly as anything embraced by the present disclosure and is not intended to be limiting to any particular exemplary embodiment of the present modular furniture system.

DETAILED DESCRIPTION

The invention relates to modular furniture components that can be assembled, disassembled, rearranged, moved and cleaned in a quick and efficient manner with minimal effort and without tools such as an allen wrench, screw driver, hammer and the like.

The invention further relates to a system of modular furniture components that can be combined into a desired furniture assembly. The system enables a user to form a number of different furniture assemblies. In an exemplary embodiment, the modular furniture assembly comprises a base pan, interchangeably referred to herein as a base, base pan or seat pan, which is modularly embellished into furniture by joining it to a set of legs and an optional back support member, for examples, that are held in place by a tool-less fastener such as a butterfly thumbscrew. The embellishment of the base enables a user to form a number of different furniture assemblies.

The base serves as a substrate or support surface on which a user can sit or use as a surface (a side table, for example). The base is configured such that the legs can slot inside of the seat pan in one standard position, secured with a thumbscrew. The design is configured to allow a user to quickly slot and un-slot the legs from the seat pan with minimal effort and without the use of a tool. Additional components can be added to this base to easily form many configurations of furniture assemblies and a variety of differing furniture assemblies.

FIG. 1 is a bottom view diagrammatic illustration of an exemplary embodiment of a base pan of a modular furniture system of the present invention. Base 110 is concave wherein sidewall 120 descends from top portion 130 to define a perimeter surface and form a concave under portion of base 110. Mounting recess 140 is, preferably, integral with the back side of base 110 and provides a structural recess for selectively attaching another modular unit, such as a back support member to base 110. For example, mounting structure 140 provides one or more slots to receive a complimentary tongue of a modular member, which is then fastened within the slot with one or more suitable fasteners such as a thumbscrew at one or more fastener receiving perforation(s) 150. Mounting structure recess 140 is formed in-part with spacers 142A/142B disposed between socket receptacles 160C and 160D.

Socket receptacles 160A, 160B, 160C, 160D (referred to herein collectively as "160A-D" or simply as "160" as will be clear from the context) are concave receptacles positioned at the corners of base 110 and each receptacle 160A through 160D is sized to receive a leg unit 610 (See FIG. 7) or other suitable support member. A leg unit 610 is inserted into one of the receptacles 160 and fastened therein with a fastener inserted through a corresponding perforation 170.

Specific exemplary embodiments provide a plurality of perforations 180 through the top surface 130 of base 110. The perforations provide certain advantages. For example, perforations 180 allow the base 110 to "breathe" for seating comfort. They let the surface drain off liquids such as a spilled beverage, or rain, if the unit is used outdoors. Additionally, they may provide mounting means for other modular units such as a cushion, upholstery, a lamp or a solid table top. In preferred embodiments, the plurality of perforations 180 include holes of varying diameter to accommodate fasteners of different sizes, and the perforations are arranged in a pattern of concentric circles to provide a wide choice of locations at which to attach modular units.

Figure 2:
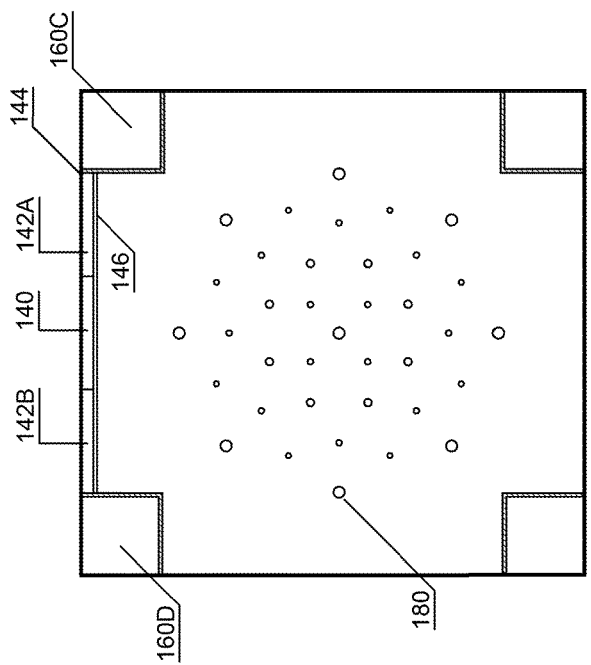
FIG. 2 is a bottom view diagrammatic illustration of the base pan of FIG. 1.

FIG. 2 is a bottom view diagrammatic illustration of the base pan of FIG. 1. Recess 140 is formed with from an interior wall 146 disposed between receptacles 160C and 160D and set in from the interior surface 144 of exterior sidewall 120. Spacers 142A and 142B are disposed within the void between surface 144 and interior wall 146 such that one end of spacer 142A abuts the perimeter of receptacle 160C and one end of spacer 142B abuts the perimeter of receptacle 160D, forming a void between the two spacers and between the exterior and interior walls. The bottom end of the void is open while the top of the void is closed by the top surface 130 of base 110, thereby forming a recess with an opening at the bottom or underside of base 110.

Figure 3:
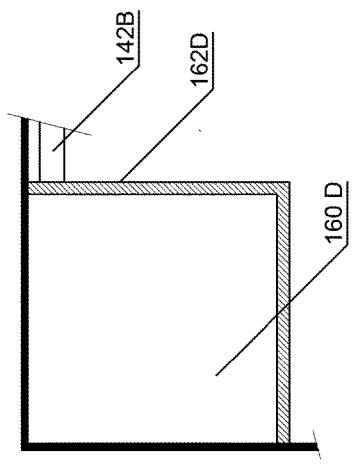
FIG. 3 is a bottom view diagrammatic illustration of a detail of a leg receptacle of the base pan of FIG. 1.

FIG. 3 is a bottom view diagrammatic illustration of a detail of a leg receptacle of the base pan of FIG. 1. One end of spacer 142B abuts an interior wall 162D of receptacle 160D.

Figure 4:
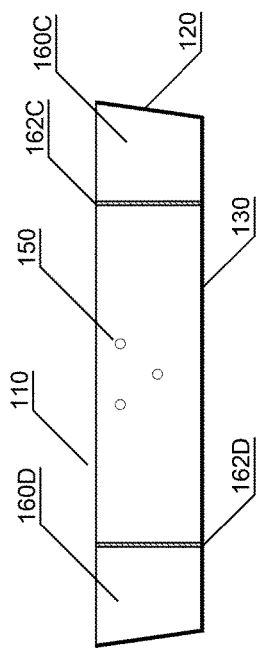
FIG. 4 is a front interior view diagrammatic illustration of a rear interior wall of a base pan of the present invention.

FIG. 4 is a front interior view diagrammatic illustration of rear interior wall 146 of base pan 110 of the present invention. Seam 162C is formed where an interior surface of receptacle 160C meets wall 146 and seam 162D is formed where an interior surface of receptacle 160D meets wall 146. One or more perforations 150 of wall 146 are useful to insert one or more fasteners 720. It will be noted that the side cross-sectional shape of base 110 is that of a parallelogram in the illustrated embodiment, wherein the skirt or sidewall 120 descends from top 130 at an outward angle.

Figure 5:
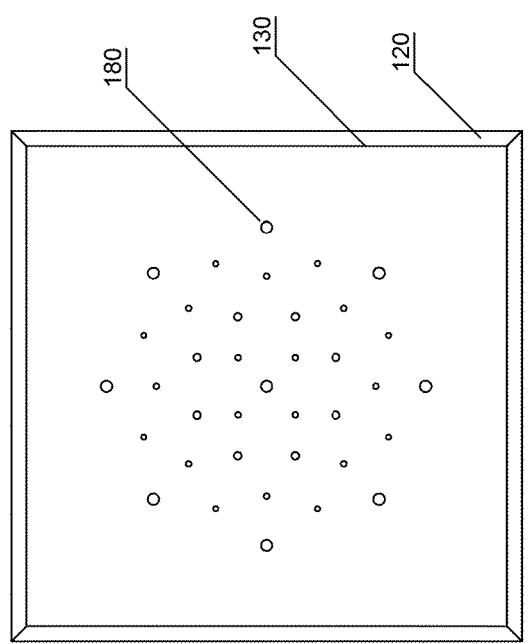
FIG. 5 is a top view diagrammatic illustration of a base pan of the present invention.

FIG. 5 is a top view diagrammatic illustration of an exemplary embodiment of a base pan of the present invention. One or more perforations 180, also shown in the bottom or underside view of the previous Figures, extend through top portion 130.

Figure 6:
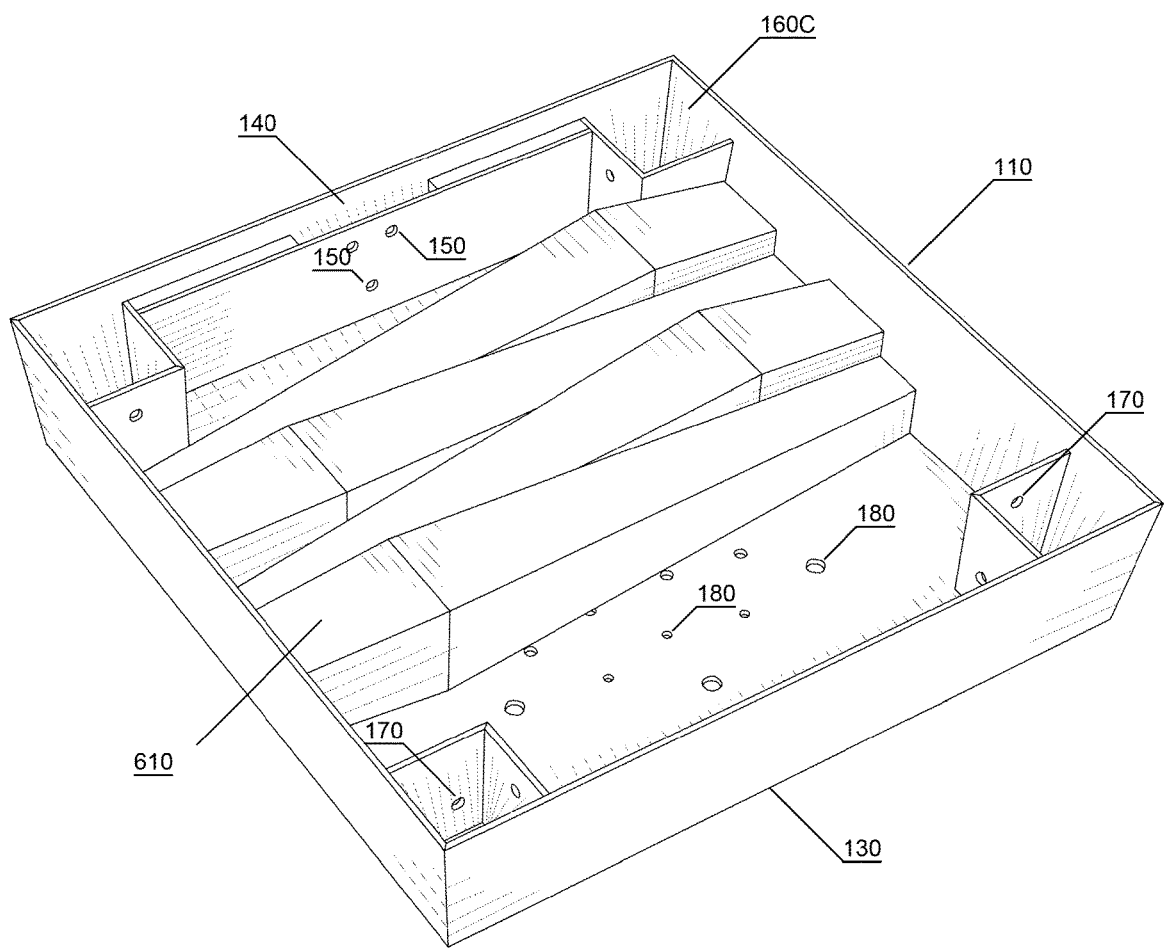
FIG. 6 is a bottom view diagrammatic illustration of a base pan of the present invention with disassembled leg units stowed therein.

FIG. 6 is a bottom view diagrammatic illustration of a base pan of the present invention with disassembled leg units stowed therein. One or more leg units 610, sized for a chair embodiment, stow neatly inside the concave void of base 110. Preferably, leg units are provided in sets of two or more leg units of the same length, and sets are provided with leg units of a selected length to assemble an article of furniture of a desired height with the system. For example, leg sets for chairs have shorter legs than leg sets for stools.

Figure 7:
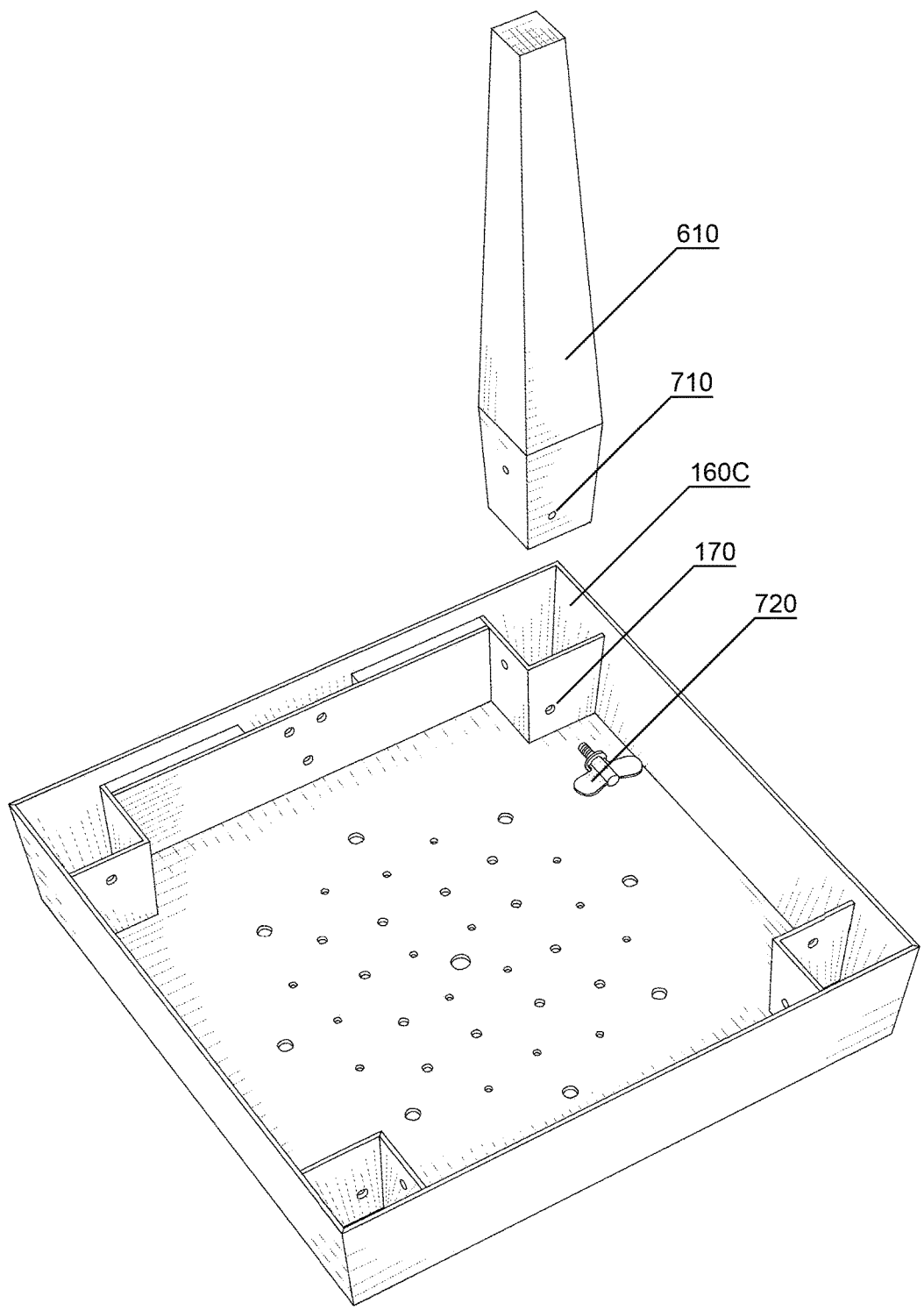
FIG. 7 is a bottom exploded view diagrammatic illustration of an exemplary embodiment of a base of the present invention and an exemplary embodiment of a leg unit of the present invention in relation to a leg unit receptacle of the base.

FIG. 7 is a bottom exploded view diagrammatic illustration of an exemplary embodiment of a base of the present invention and an exemplary embodiment of a leg unit of the present invention in relation to a leg unit receptacle of base 110. Leg unit 610 selectively inserts into leg receptacle 160C. The top portion of leg unit 610 provides one or more guide holes 710 to receive fastener 720 through receptacle 160C perforation 170.

FIG. 8A is a front view isometric diagrammatic illustration of a modular chair of the present invention. One or more legs units 610 are mounted under base 110, as described above. Back support unit 810, a chair back in this example, is mounted to the back of base 110 with mounting member 820 via base 110 recess 140. Mounting member 820 is a continuous piece which has a base mounting segment 822 that fastens to base 110 and a back support unit mounting segment 824 that fastens to back unit 810.

FIG. 8B is a front view diagrammatic illustration of the modular chair of FIG. 8A. The base mounting segment 822 of mounting member 820 is partially obscured by base 110.

FIG. 8C is a rear view diagrammatic illustration of the modular chair of FIG. 8A. More of base mounting segment 822 of mounting member 820 is visible.

FIG. 9 is a side view diagrammatic illustration of an exemplary embodiment of chair back mounting member 820 of the present invention. Base mounting segment 822 further consists of exterior descending segment 912, hairpin turn segment 910, and vertical segment, or tongue, 920, to provide a U-shaped structure. Tongue 920 selectively inserts into recess 140 of base 110. In some specific exemplary embodiments of a system of the present invention base mounting member 820 is integral with a back support member such as chair back 810, whereas in other specific exemplary embodiments of the present system base mounting member 820 is a separate, free standing, modular component that can be utilize to mount other system components to base 110.

FIG. 10 is a front view diagrammatic illustration of a detail of the mounting member 820 of FIG. 9, specifically, segment 920 of mounting member 820. Segment 920 provides on or more guides holes 922 to receive one or more fasteners 720 through one or more interior wall perforations 150 when mounting member tongue 920 is disposed within recess 140 of base 110.

FIG. 11 is a front view diagrammatic illustration of the mounting unit of FIG. 9 with a back unit attached thereto. Back unit 810 is attached to mounting member 820 at back unit mounting segment 824.

FIG. 12 is a rear view diagrammatic illustration of the mounting unit with back unit of FIG. 11. Mounting member segment 912 is contiguous with back unit mounting segment 824.

FIG. 13 is a top view of the back unit of FIG. 12. The wire mesh back 810 of the exemplary embodiment illustrated in FIGS. 8A-8C, 11 and 12 is revealed to be curved in a concave arc for ergonomic comfort.

Figure 14:
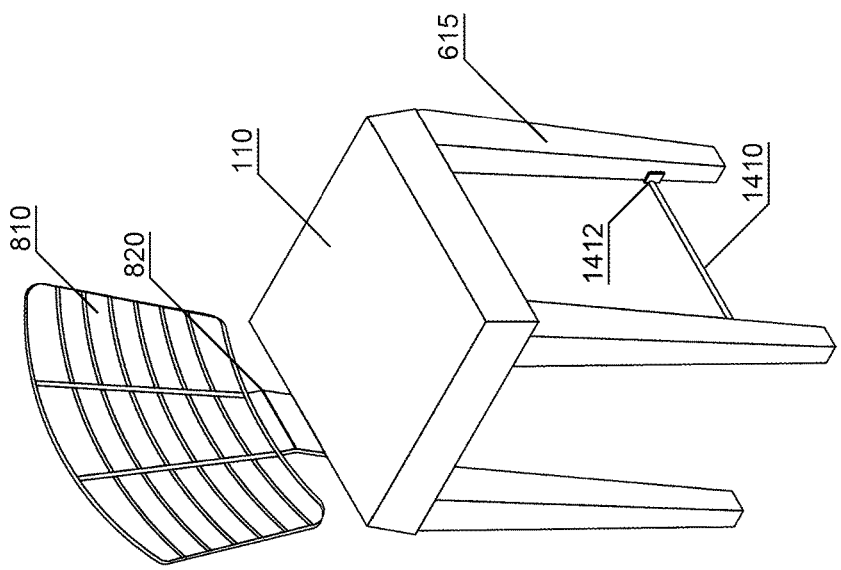
FIG. 14 is front view isometric diagrammatic illustration of an exemplary embodiment of a modular stool of the present invention.

FIG. 14 is front view isometric diagrammatic illustration of an exemplary embodiment of a modular stool of the present invention. As an example of the modularity of the present modular furniture system, base 110 can be embellished with a set of longer leg units to form a stool, such as a bar stool, instead of a chair. Base 110 accepts one or more stool leg units 615 in a corresponding receptacle 160A-160D. Stool legs units are taller than chair leg units previously described for chair embodiments. To provide safety and stability with the taller stool leg units, a system of the present invention provides one or more cross members 1410 which span between and connect to two stool leg units 615, preferably the front leg units, with attachment portion 1412.

Figure 15:
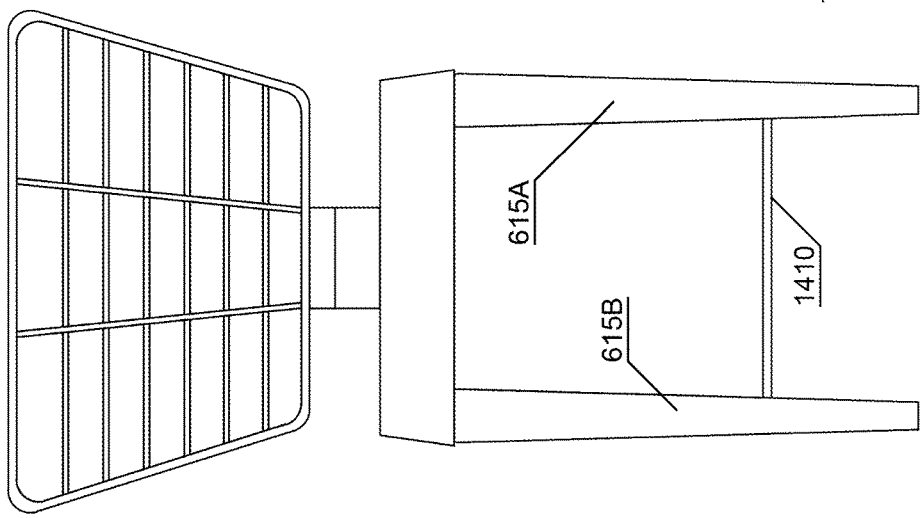
FIG. 15 is a front view diagrammatic illustration of the modular stool of FIG. 14.

FIG. 15 is a front view diagrammatic illustration of the modular stool of FIG. 14. One cross member of the one or more cross members 1410 spans between front stool leg units 615A/615B. Attachment portions 1412 of the cross member 1410 is obstructed from view in this view.

Figure 16:
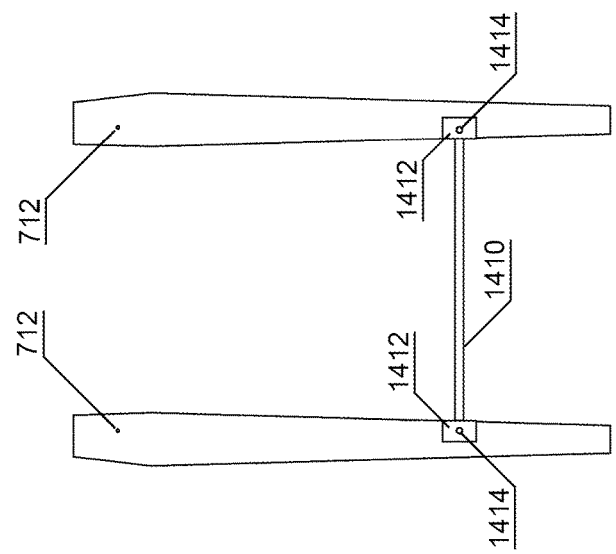
FIG. 16 is a rear view diagrammatic illustration of a detail of the modular stool of FIG. 14.

FIG. 16 is a rear view diagrammatic illustration of a detail of the modular stool of FIG. 14. In this rear view, base 110 is removed to show that each of the leg units 615 are tapered at their respective top to be received by receptacles 160A-160D of base 110. Each leg unit provides a guide hole 712 to receive a fastener 720 through one of receptacle 160A-160D perforations 170. Cross member 1410 is fastened to two leg units 615 with attachment portions 1412 with a fastener 720 (not shown) through each respective guide hole 1414.

FIG. 17 is a front view isometric diagrammatic illustration of an exemplary alternative embodiment of a modular stool of the present invention. Instead of wire mesh back unit 810 described above, base 110 can be fitted with an alternative style of back support unit, such as strap back unit 850. An advantage of a back support unit style such as strap back unit 850 is that such a back support unit can be made of a variety of materials such as wood or plastic. An additional modular feature is upholstered cushion 1710 coupled to base 110 with one or more fasteners 720 through one or more perforations 180.

Strap back unit 850 provides side members 852/854 which can serve as arm rests or simply provide a secure sitting environment. Side members 852/854 are secured to base 110 with one or more supplemental mounting members 860 attached to a side member and to a corresponding side of base 110.

An alternative type of leg unit cross member 1420 is also illustrated. Cross member 1420 provides horizontal extension portions 1422/1424 at each terminal end which advantageously protrude slightly to provide a foot support while sitting on the stool.

FIG. 18 is a front view diagrammatic illustration of the modular stool of FIG. 17. One of supplemental mounting member 860 is connected to one of the side members 852/854 and latches under a side of base 110 with a hook or curved lip at the lower terminus which snaps into place to secure one of side member 852/854 to base 110.

FIG. 19 is a side view diagrammatic illustration of the stool of FIG. 17. Rear back unit mounting member 820 mounts to base 110 with recess 140 as previously described.

FIG. 20A is a front view diagrammatic illustration of an exemplary embodiment of a stool leg support member of a modular furniture system of the present invention. Cross member 1410 spans between two leg units 615 and attaches to the leg units with attachment portions 1412 disposed at each terminus of member 1410.

FIG. 20B is a top view diagrammatic illustration of an exemplary alternative embodiment of a stool leg support member of a modular furniture system of the present invention. Reinforcement of leg units 615 is provided with cross-shaped support member 2010. Radiating diagonally from a central intersection are four arms such as arm 1415 with each arm 1415 terminating in a V-shaped receiving structure 1417 into which fits a leg unit 615 for attachment.

FIG. 21 is a side view diagrammatic illustration of an exemplary embodiment of a leg member of the present invention. Top portion 616, distal from foot end 617, is tapered to fit into one of base 110 receptacles 160A-160D.

FIG. 22A is a top view diagrammatic illustration of an exemplary embodiment of a table top of a modular furniture system of the present invention. Another example of modularity is a table. Table top 2110 can be attached to base 110 with a fastener 720 through table guide hole 2115 and a selected one of the one or more perforations 180 of base 110.

FIG. 22B is a side cross-section view diagrammatic illustration of the table top of FIG. 22A. Guide hole 2115 perforates table top 2110.

FIG. 23A is a side view diagrammatic illustration of an exemplary embodiment of a fastener of a modular furniture system of the present invention. Fastener 720 requires no tools to use. Butterfly wings 722 may be turned by hand to drive screw portion 724 into a selected guide hole or perforation of a selected component of the present modular furniture system.

FIG. 23B is a top view diagrammatic illustration of the fastener of FIG. 23A. Butterfly wings 722 extend outward from a central axis 725 that terminates distally at screw portion 724.

Figure 24:
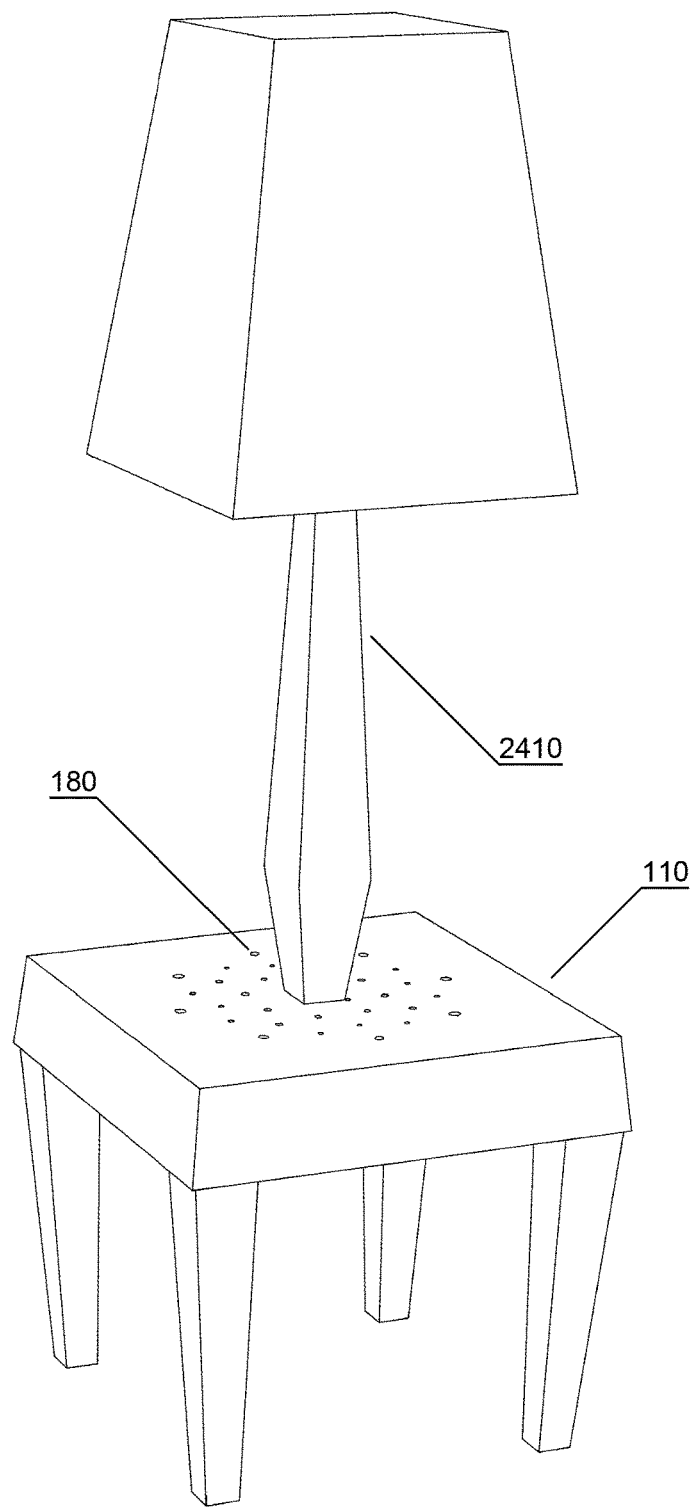
FIG. 24 is a top view isometric diagrammatic illustration of an exemplary embodiment of a lamp of a modular furniture system of the present invention.
Figure 25:
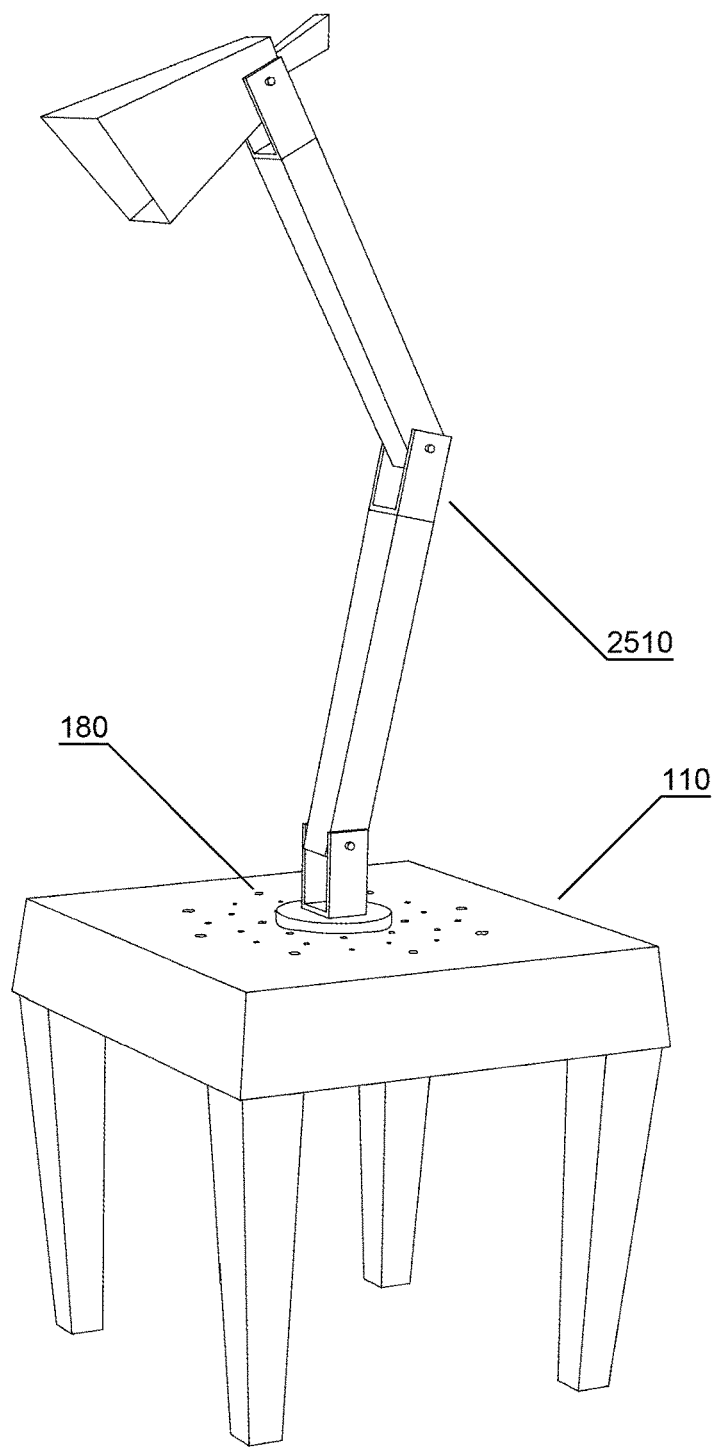
FIG. 25 is a top view isometric diagrammatic illustration of an exemplary alternative embodiment of a lamp of a modular furniture system of the present invention.

FIGS. 24 and 25 illustrate still another advantageous modular features; in particular a variety of table lamp embodiments. A side table lamp 2410, for example, or a study lamp 2510, can be fastened to base 110 using one or more fasteners 720 through at least one of the plurality of perforations 180.

The base 110 and an assortment of component units, members, or pieces selected by a user of the present system, and held in place by one or more fasteners such as thumbscrews, are modularly adapted in a variety of configurations so as to form a variety of unique and custom furniture assemblies. A system or kit of the present invention is fairly summarized as providing a plurality of tool-less fasteners and a collection of a plurality of furniture components selectively connectable to each other with one or more of the fasteners to assemble a desired article of furniture.

In certain preferred embodiments, some of the components, such as fasteners and leg units, are provided in sets such that each set contains a plurality of the units. The basic system enables the convenient formation of a variety of different types of furniture assemblies. The system is configurable, for example, to provide a comfortable item for sitting on or solid table surface to set objects on. The components of the system are intended to be easily disassembled for rearranging, moving, storing and/or shipping. In certain embodiments, the system includes the components for a sitting assembly of varying heights and a plurality of attachments, which can further include a cushion, a variety of back supports, tabletops, or lighting components, for example. It will also be understood that the various components can be fabricated from a wide variety of suitable materials including metal, wood, plastic, polymer, synthetic and natural materials, and combinations thereof.

The use of a modular furniture system of the present disclosure provides many advantages over the prior art including the ability to concatenate components to create extended pieces of furniture. For example, two or more bases 110 can be joined to form a bench or, combined with stool leg units, a tall buffet.

Many modifications and other embodiments of the modular furniture system described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system of modular components to assemble a desired article of furniture such as a table, a stool, or a chair, the system comprising:
   one or more optionally connectable bases, each one of the one or more bases having a top portion a recessed concave under portion that opens away from the top portion and is coextensive therewith, a plurality of socket receptacles disposed in the recessed concave under portion, the recessed concave under portion further comprising an integral mounting structure recess comprising one or more perforations to receive one or more fasteners, the integral mounting structure recess being formed by an interior wall set apart from an exterior wall and disposed between two of the plurality of socket receptacles to form a slot-shaped void and a pair of spacers disposed in the slot-shaped void and set apart so each one of the pair of spacers abuts a corresponding socket receptacle such that the slot-shaped void is aligned with the one or more perforations of the integral mounting structure;
   a plurality of leg units, each one of the plurality of leg units having a top portion that fits into at least one of the plurality of socket receptacles of at least one of the one or more bases;
   one or more back support members, each one of the one or more back support members having a portion complimentary to the integral mounting structure recess of the one or more bases for selectively mounting at least one of the one or more back support members to at least one of the one or more bases; and
   one or more fasteners to attach at least one of the plurality of leg members and at least one of the one or more back support members to at least one of the one or more bases;
   whereby the one or more bases, one or more leg units, one or more back support members, and one or more fasteners are modularly and optionally arranged to assemble a desired article of furniture such as a table, a stool, or a chair.

2. The system of claim 1, further comprising one or more mounting members attachable to at least one of the one or more back support members to provide the portion of the at least one of the one or more back support members that is complimentary to the integral mounting structure recess.

3. The system of claim 1, wherein at least one of the one or more bases has a plurality of perforations in an array, each one of the plurality of perforations extending from the under portion of the at least one or more bases through the top portion of the at least one or more bases to form an aperture.

4. The system of claim 1, wherein the plurality of leg units are provided in sets of two or more leg units of the same length and further wherein sets are provided with leg units of a selected length to assemble an article of furniture of a desired height with the system.

5. The system of claim 1, further comprising one or more selectively attachable cross members other than the one or more bases, the one or more selectively attachable cross members being selectively attachable to two of the plurality of legs units apart from the one or more bases to provide structural stability.

6. The system of claim 1, wherein at least one of the one or more fasteners is tool-less.

7. The system of claim 1 further comprising a table top member selectively attachable to one of the one or more bases.

8. The system of claim 1, further comprising a lamp selectively attachable to one of the one or more bases.

9. The system of claim 1, further comprising one or more upholstered unit selectively attachable to one of the one or more bases.

10. The system of claim 1, wherein the one or bases comprises at least two or more of the one or more bases and further wherein at least two of the two or more bases selectively attach to each other.

11. A system of modular components to assemble a desired article of furniture such as a table, a stool, or a chair, the system comprising:
   one or more optionally connectable bases, each one of the one or more bases having a top portion, a recessed concave under portion that opens away from the top portion and is coextensive therewith, a plurality of socket receptacles disposed in the recessed concave under portion, the recessed concave under portion further comprising an integral mounting structure comprising one or more perforations to receive one or more tool-less fasteners, the integral mounting structure recess being formed by an interior wall set apart from an exterior wall to form a slot-shaped void and a pair of spacers disposed in the slot-shaped void and set apart so each one of the pair of spacers abuts a corresponding socket receptacle such that the slot-shaped void is aligned with the one or more perforations of the integral mounting structure;

at least one set of leg units, wherein a set provides a plurality of leg units, each leg unit having a top portion that fits into at least one of the plurality of socket receptacles of at least one of the one or more bases; and one or more tool-less fasteners to attach at least one of the plurality of leg members to at least one of the one or more bases;

whereby the one or more bases, one or more leg units, one or more back support members, and one or more fasteners are modularly and optionally arranged to assemble a desired article of furniture such as a table, a stool, or a chair.

12. The system of claim 11, further comprising one or more mounting members, each of the one or more mounting members having a first end complimentary to and connectable to the integral mounting structure recess and a second end attachable to a selected component of the system.

13. The system of claim 12, further comprising one or more back support members, each one of the one or more back support members being connectable to the second end of at least one of the one or more mounting members for selectively mounting at least one of the one or more back support members to at least one of the one or more.

14. The system of claim 11, further comprising one or more selectively attachable cross members other than the one or more bases, the one or more selectively attachable cross members being selectively attachable to two of the plurality of legs units apart from the one or more bases to provide structural stability.

15. A system of modular components to assemble a desired article of furniture such as a table, a stool, or a chair, the system comprising:

a plurality of tool-less fasteners; and a collection of a plurality of furniture components selectively connectable to each other with one or more of the plurality of tool-less fasteners to assemble a desired article of furniture, wherein the plurality of furniture components further comprises one or more bases, each one of the one or more bases having a top portion, a recessed concave under portion that opens away from the top portion and is coextensive therewith, a plurality of socket receptacles disposed in the recessed concave under portion, and an integral mounting structure recess disposed in the recessed concave under portion, the integral mounting structure comprising one or more perforations to receive one or more tool-less fasteners, the integral mounting structure recess being formed by an interior wall set apart from an exterior wall to form a slot-shaped void and a pair of spacers disposed in the slot-shaped void and set apart so each one of the pair of spacers abuts a corresponding socket receptacle such that the slot-shaped void is aligned with the one or more perforations of the integral mounting structure;

whereby the plurality of furniture components and one or more fasteners are modularly and optionally arranged to assemble a desired article of furniture such as a table, a stool, or a chair.

* * * * *